(12) United States Patent
Kitamori

(10) Patent No.: US 11,825,180 B2
(45) Date of Patent: Nov. 21, 2023

(54) VIBRATION DEVICE

(71) Applicant: Murata Manufacturing Co., Ltd., Nagaokakyo (JP)

(72) Inventor: Nobumasa Kitamori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 384 days.

(21) Appl. No.: 17/376,206

(22) Filed: Jul. 15, 2021

(65) Prior Publication Data

US 2021/0360134 A1 Nov. 18, 2021

Related U.S. Application Data

(63) Continuation of application No. PCT/JP2020/048773, filed on Dec. 25, 2020.

(30) Foreign Application Priority Data

May 15, 2020 (JP) .................................. 2020-086025

(51) Int. Cl.
*H04N 23/52* (2023.01)
*H02N 2/00* (2006.01)
(Continued)

(52) U.S. Cl.
CPC ......... *H04N 23/52* (2023.01); *G02B 27/0006* (2013.01); *H02N 2/001* (2013.01); *H02N 2/0075* (2013.01)

(58) Field of Classification Search
CPC .... H02N 2/0075; H02N 2/001; H02N 2/0085; G02B 27/0006; H04N 23/52; H04N 23/68; H04N 23/682
See application file for complete search history.

(56) References Cited

U.S. PATENT DOCUMENTS 10,268,039 B2 * 4/2019 Nishiyama ................ B06B 1/06
10,444,495 B2 * 10/2019 Fujimoto ................ G02B 27/00
(Continued)

FOREIGN PATENT DOCUMENTS

JP 08-251954 A 9/1996
JP 2006-048302 A 2/2006
(Continued)

OTHER PUBLICATIONS

Official Communication issued in International Patent Application No. PCT/JP2020/048773, dated Mar. 16, 2021.

*Primary Examiner* — Marly S Camargo
(74) *Attorney, Agent, or Firm* — KEATING & BENNETT, LLP

(57) ABSTRACT

A vibration device includes a cylindrical body including an opening, a light-transmissive cover joined to the cylindrical body, a piezoelectric element directly or indirectly joined to the cylindrical body and including first and second main surfaces, and a power feeder joined to the piezoelectric element. The power feeder includes a substrate including first and second surfaces, first and second power feeding electrodes on the first surface or the second surface, and first and second external connection electrodes. The power feeder sandwiches the piezoelectric element in a thickness direction, and the first and second power feeding electrodes are joined to the first main surface or the second main surface of the piezoelectric element. Portions of the substrate, which are not located on the first and second main surfaces of the piezoelectric element, are bent to sandwich the piezoelectric element.

20 Claims, 13 Drawing Sheets

(51) Int. Cl.
*G02B 27/00* (2006.01)
*H04N 23/68* (2023.01)

(56) References Cited

U.S. PATENT DOCUMENTS

| | | |
|---|---|---|
| 10,768,507 B2 * | 9/2020 | Fujimoto ............... G02B 27/00 |
| 11,002,954 B2 * | 5/2021 | Kuratani ............... G02B 27/00 |
| 11,161,148 B2 * | 11/2021 | Fujimoto ............... H04N 23/00 |
| 11,434,891 B2 * | 9/2022 | Fujimoto ................. B06B 1/06 |
| 11,770,078 B2 * | 9/2023 | Fujimoto ............... H02N 2/001 |
| 2006/0028095 A1 | 2/2006 | Maruyama et al. |
| 2018/0095272 A1 | 4/2018 | Fujimoto et al. |
| 2018/0239218 A1 | 8/2018 | Ikeuchi et al. |
| 2019/0033685 A1 | 1/2019 | Fujimoto et al. |
| 2020/0057301 A1 | 2/2020 | Kuratani et al. |
| 2021/0341732 A1 * | 11/2021 | Kitamori ............ G02B 27/0006 |

FOREIGN PATENT DOCUMENTS

| | | |
|---|---|---|
| JP | 2014-033478 A | 2/2014 |
| WO | 2017/022382 A1 | 2/2017 |
| WO | 2017/110563 A1 | 6/2017 |
| WO | 2017/221622 A1 | 12/2017 |
| WO | 2018/198465 A1 | 11/2018 |

* cited by examiner

VIBRATION DEVICE

CROSS REFERENCE TO RELATED APPLICATIONS

This application claims the benefit of priority to Japanese Patent Application No. 2020-086025 filed on May 15, 2020 and is a Continuation Application of PCT Application No. PCT/JP2020/048773 filed on Dec. 25, 2020. The entire contents of each application are hereby incorporated herein by reference.

BACKGROUND OF THE INVENTION

1. Field of the Invention

The present invention relates to a vibration device capable of removing water droplets and the like by mechanical vibration.

2. Description of the Related Art

In an imaging device, such as a camera that is used as a monitoring device, it is required to make a visual field thereof clear all the time. In particular, various mechanisms for removing water droplets, such as raindrops, have been proposed for cameras that are used outdoors for in-vehicle applications or the like. International Publication No. 2017/022382 below discloses an example of a vibration device incorporating a camera main body. A light transmissive portion is disposed in front of the camera main body. The camera main body includes an imaging unit configured to photoelectrically convert light that has passed through the light transmissive portion and a lens. In order to remove water droplets adhering to the light transmissive portion, a piezoelectric vibrator causes the light transmissive portion to vibrate. The piezoelectric vibrator includes a piezoelectric plate and a pair of terminals. The piezoelectric plate is sandwiched between the pair of terminals. An AC electric field is applied to the piezoelectric plate from the terminals.

Japanese Unexamined Patent Application Publication No. 2006-048302 and Japanese Unexamined Patent Application Publication No. 8-251954 disclose examples of modes with which electric power is fed to an element such as a piezoelectric vibrator. Japanese Unexamined Patent Application Publication No. 2006-048302 discloses a piezoelectric composite device including a piezoelectric bimorph actuator. The actuator includes a plurality of terminals. The plurality of terminals are provided on the upper and lower surfaces of a piezoelectric body. Led-out wiring lines are connected to the plurality of terminals, respectively. The actuator receives feeding of electric power using the led-out wiring lines.

Japanese Unexamined Patent Application Publication No. 8-251954 discloses an ultrasonic vibrator including a flexible printed circuit board for power feeding. A portion of the flexible printed circuit board is sandwiched between a multilayer piezoelectric element and a lower vibrating body. The flexible printed circuit board includes five wiring lines. Therefore, five wiring patterns are formed in a portion of the flexible printed circuit board, which is connected to the multilayer piezoelectric element.

In the actuator described in Japanese Unexamined Patent Application Publication No. 2006-048302, the terminals and the led-out wiring lines are joined by soldering. Therefore, when stress or the like is applied to joint portions between the terminals and the led-out wiring lines, the joint portions tend to break.

On the other hand, the flexible printed circuit board described in Japanese Unexamined Patent Application Publication No. 8-251954 is sandwiched between the multilayer piezoelectric element and the lower vibrating body. Complicated wiring patterns are formed on the portion of the flexible printed circuit board, which is connected to the multilayer piezoelectric element. Therefore, symmetry and uniformity of distribution of stress that is applied to the piezoelectric body and distribution of displacement of the piezoelectric body may be impaired. For this reason, when the wiring for power feeding as described above is used in the vibration device for removing water droplets, it is difficult to enhance reliability of the wiring joint and uniformity of displacement of the light transmissive portion.

SUMMARY OF THE INVENTION

Preferred embodiments of the present invention provide vibration devices that are each able to improve the reliability of a wiring joint and improve vibration performance.

A vibration device according to a preferred embodiment of the present invention includes a cylindrical body including an opening, a first opening end surface, and a second opening end surface, a light-transmissive cover joined to the first opening end surface of the cylindrical body to cover the opening of the cylindrical body, a piezoelectric element directly or indirectly joined to the second opening end surface of the cylindrical body and including a first main surface and a second main surface, and a power feeder joined to the piezoelectric element, wherein the power feeder includes a substrate including a first surface and a second surface facing each other, a first power feeding electrode and a second power feeding electrode on the first surface or the second surface and electrically insulated from each other, and a first external connection electrode and a second external connection electrode on the first surface or the second surface, the first external connection electrode being connected to the first power feeding electrode and the second external connection electrode being connected to the second power feeding electrode, the power feeder sandwiches the piezoelectric element in a thickness direction, and the first power feeding electrode and the second power feeding electrode are joined to the first main surface or the second main surface of the piezoelectric element, and portions of the substrate of the power feeder, which are not located on the first main surface and the second main surface of the piezoelectric element, are bent to sandwich the piezoelectric element in the thickness direction.

With the vibration devices according to preferred embodiments of the present invention, it is possible to improve the reliability of a wiring joint and to improve vibration performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be clarified by describing preferred embodiments of the present invention with reference to the accompanying drawings.

Each of the preferred embodiments described in the present specification is exemplary and partial replacement or combination of components between different preferred embodiments is possible.

Figure 1:
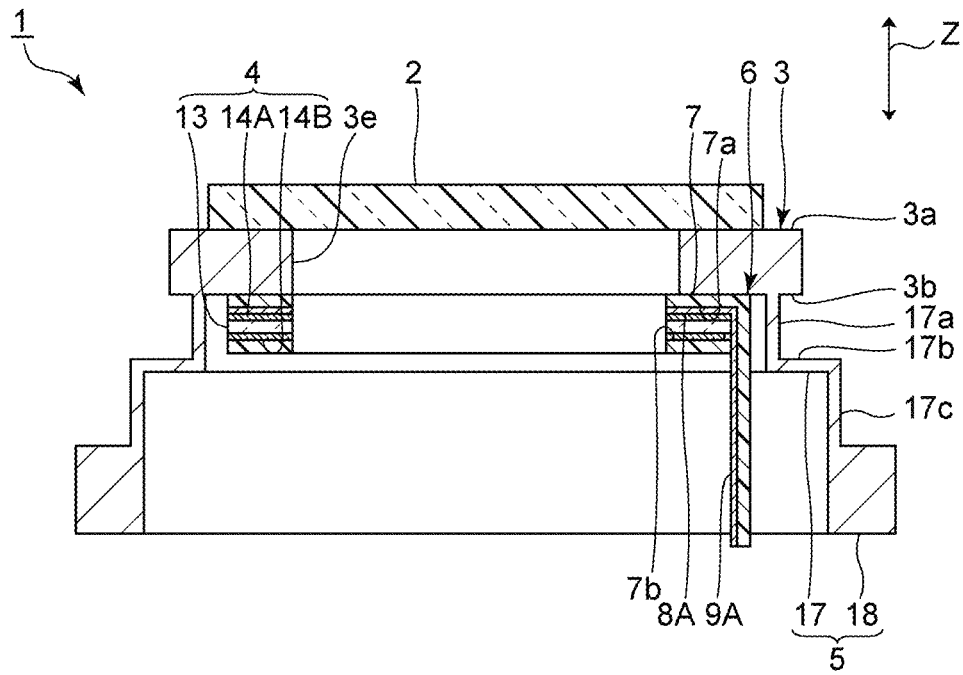
FIG. 1 is a front cross-sectional view of a vibration device according to a first preferred embodiment of the present invention.
Figure 2:
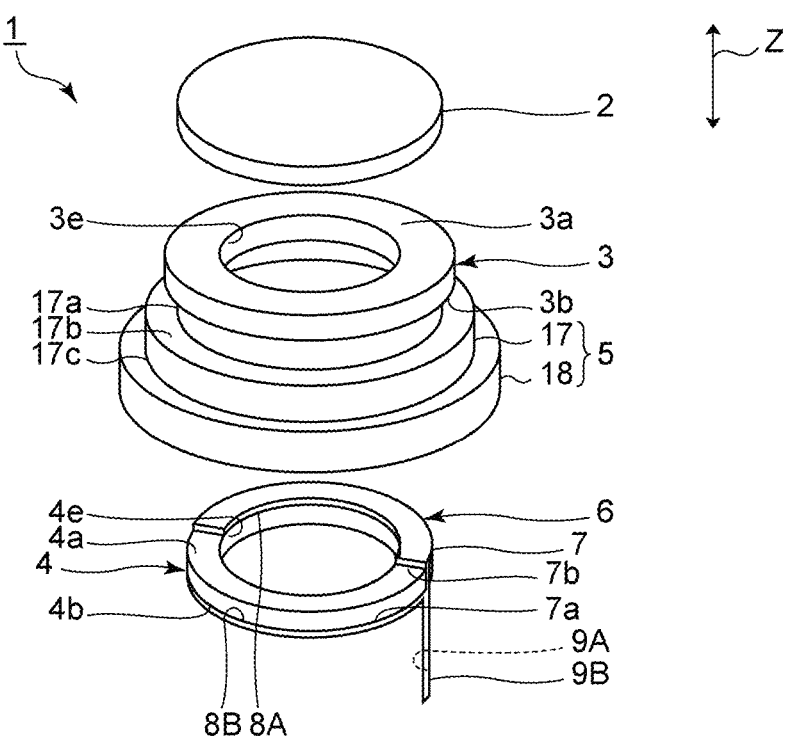
FIG. 2 is an exploded perspective view of the vibration device according to the first preferred embodiment of the present invention.
Figure 3:
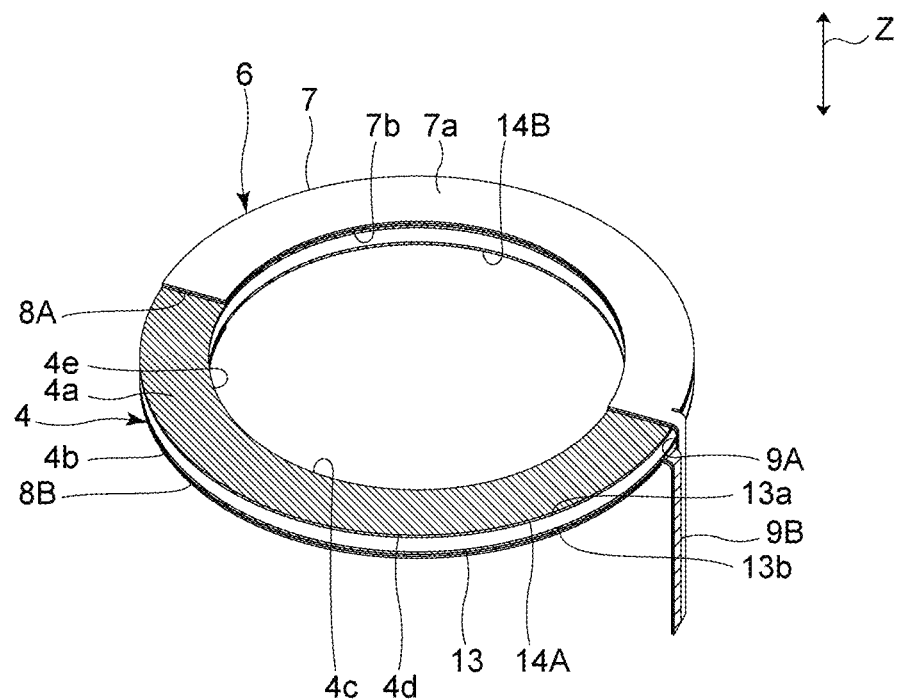
FIG. 3 is a perspective view of a piezoelectric element and a power feeding member in the first preferred embodiment of the present invention.

FIG. 1 is a front cross-sectional view of a vibration device according to a first preferred embodiment of the present invention. FIG. 2 is an exploded perspective view of the vibration device according to the first preferred embodiment. FIG. 3 is a perspective view of a piezoelectric element and a power feeding member in the first preferred embodiment. In FIG. 3, electrodes are indicated by hatching. The same applies to perspective views of drawings subsequent to FIG. 3.

A vibration device 1 illustrated in FIG. 1 and FIG. 2 removes water droplets and foreign substances from a visual field of an imaging element, or the like, for example, by moving the water droplets and foreign substances by vibration or atomizing the water droplets and the like. The vibration device 1 includes a light-transmissive cover 2, a cylindrical body 3, a piezoelectric element 4, a holding member 5, and a power feeding member 6.

An internal space is defined by the light-transmissive cover 2, the cylindrical body 3, and the holding member 5. An optical detection element, such as the imaging element, for example, is disposed in the internal space. In the present specification, the internal space is not limited to a sealed space, and a space that partially opens to the outside is also referred to as the internal space.

The cylindrical body 3 includes an opening 3e, a first opening end surface 3a, and a second opening end surface 3b. A direction connecting the first opening end surface 3a and the second opening end surface 3b of the cylindrical body 3 is defined as an axial direction Z, and a direction orthogonal or substantially orthogonal to the axial direction Z is defined as a radial direction. The cylindrical body 3 extends in the axial direction Z. In the present preferred embodiment, the cylindrical body 3 has a cylindrical or substantially cylindrical shape. In the present preferred embodiment, the cylindrical body 3 is made of metal, for example. A material of the cylindrical body 3 is not limited to metal, and for example, ceramics, glass, or the like can also be used therefor.

The light-transmissive cover 2 is joined to the first opening end surface 3a of the cylindrical body 3. More specifically, the light-transmissive cover 2 is directly joined to the cylindrical body 3 so as to cover the opening 3e of the cylindrical body 3. The light-transmissive cover 2 has a disk shape. The shape of the light-transmissive cover 2 is not limited to the above and may be, for example, a dome shape. The shape of the light-transmissive cover 2 in a plan view may be, for example, a polygonal shape. In the present specification, a plan view refers to a direction viewed from above in the axial direction Z. The upper side in the axial direction Z corresponds to the upper side in FIG. 1.

As a material of the light-transmissive cover 2, for example, light-transmissive plastic, quartz, glass such as borosilicate glass or soda-lime glass, light-transmissive ceramics, or the like can be used. In the present specification, the term "light-transmissive" means a light-transmitting property that transmits at least an energy ray or light having a wavelength to be detected by the optical detection element, such as the imaging element, for example.

The piezoelectric element 4 is joined to the second opening end surface 3b of the cylindrical body 3. As illustrated in FIG. 3, the piezoelectric element 4 includes an opening 4e and has an annular shape. The piezoelectric element 4 includes an annular piezoelectric body 13. The piezoelectric body 13 includes a first surface 13a and a second surface 13b. The first surface 13a and the second surface 13b face each other in the axial direction Z. As a material of the piezoelectric body 13, for example, appropriate piezoelectric ceramics such as lead zirconate titanate (PZT), lead titanate (PT), and (K, Na)NbO$_3$ or an appropriate piezoelectric single crystal such as LiTaO$_3$ and LiNbO$_3$ may be used. The shape of the piezoelectric body 13 is not limited to the above.

The piezoelectric element 4 includes a first electrode 14A and a second electrode 14B. The first electrode 14A is provided on the first surface 13a of the piezoelectric body 13. The second electrode 14B is provided on the second surface 13b. The first electrode 14A and the second electrode 14B face each other. Each of the first electrode 14A and the second electrode 14B has an annular shape. As materials of the first electrode 14A and the second electrode 14B, for example, appropriate metal can be used. The first electrode 14A and the second electrode 14B may be, for example, electrodes a metallic thin film made of Ag, Au, or the like. In this case, the first electrode 14A and the second electrode 14B can be formed by a sputtering method or the like, for example.

The piezoelectric element 4 includes a first main surface 4a and a second main surface 4b. The first main surface 4a includes the first electrode 14A. The second main surface 4b includes the second electrode 14B. Of the first main surface 4a and the second main surface 4b, the first main surface 4a is located on the cylindrical body 3 side.

In FIG. 1, the holding member 5 is joined to the second opening end surface 3b of the cylindrical body 3. The cylindrical body 3 and the holding member 5 may be joined by welding or the like. Alternatively, the cylindrical body 3 and the holding member 5 may be integrally formed by a unitary structure. The holding member 5 includes a spring portion 17 and a bottom portion 18. One end portion of the spring portion 17 is connected to the second opening end surface 3b of the cylindrical body 3. The bottom portion 18 is continuous to the other end portion of the spring portion 17. The cross-sectional shape of the spring portion 17 along the axial direction Z is a stepped shape. The bottom portion has a cylindrical or substantially cylindrical shape. The shapes of the spring portion 17 and the bottom portion 18 are not limited to those described above. The spring portion 17 may have, for example, a cylindrical or substantially cylindrical shape, a rectangular or substantially rectangular cylindrical shape, or the like. The bottom portion 18 may have, for example, a rectangular or substantially rectangular cylindrical shape, or the like.

The holding member 5 is made of an appropriate metal, for example. A material of the holding member 5 is not limited to metal, and for example, ceramics, glass, or the like can also be used therefor. The vibration device 1 is fixed to the outside, for example, at the bottom portion 18 of the holding member 5.

As illustrated in FIG. 3, the power feeding member 6 is joined to the piezoelectric element 4. The power feeding member 6 includes a substrate 7, a first power feeding electrode 8A, a second power feeding electrode 8B, a first external connection electrode 9A, and a second external connection electrode 9B. The substrate 7 includes a first surface 7a and a second surface 7b. The first surface 7a and the second surface 7b face each other. The substrate 7 is a flexible substrate that can be bent. The substrate 7 is made of, for example, resin such as polyimide. The substrate 7 is not necessarily made of resin. An insulator may be provided on a thin metal plate, and the above-described respective electrodes may be provided thereon. The first power feeding electrode 8A, the second power feeding electrode 8B, the first external connection electrode 9A, and the second external connection electrode 9B are made of an appropriate metal, for example.

Figure 4:
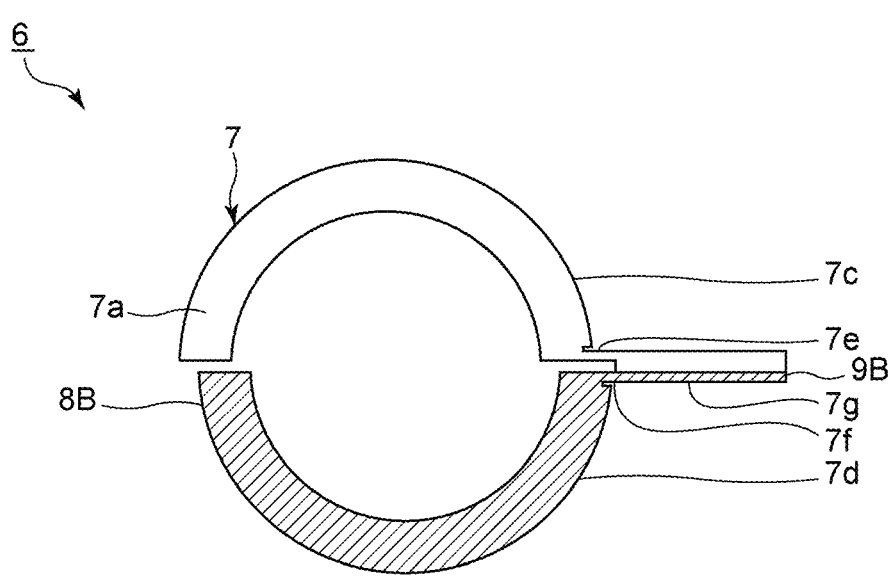
FIG. 4 is a plan view of the power feeding member in an unbent state in the first preferred embodiment of the present invention.
Figure 5:
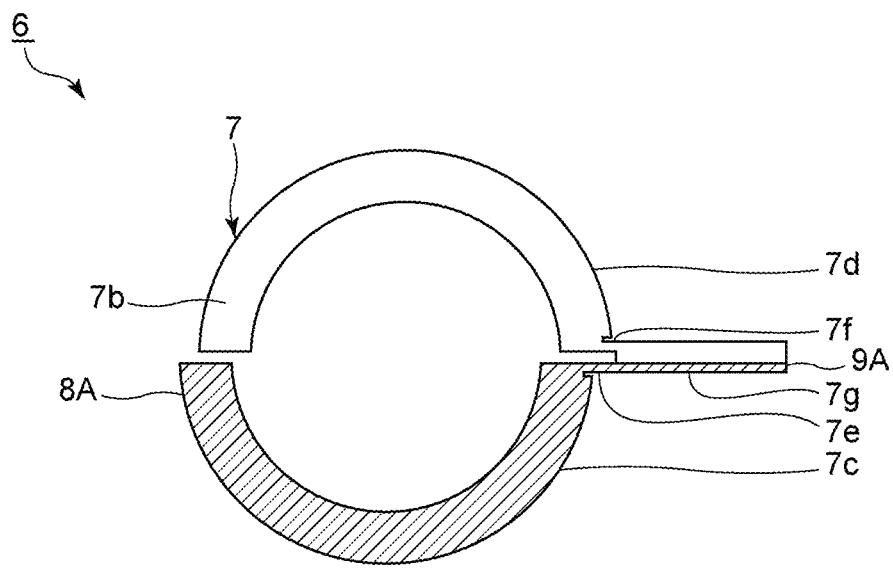
FIG. 5 is a bottom view of the power feeding member in the unbent state in the first preferred embodiment of the present invention.

FIG. 4 is a plan view of the power feeding member in an unbent state in the first preferred embodiment. FIG. 5 is a bottom view of the power feeding member in the unbent state in the first preferred embodiment. In FIG. 4 and FIG. 5, the electrodes are indicated by hatching.

As illustrated in FIG. 4, the second power feeding electrode 8B and the second external connection electrode 9B are provided on the first surface 7a of the substrate 7. The second external connection electrode 9B is connected to the second power feeding electrode 8B. As illustrated in FIG. 5, the first power feeding electrode 8A and the first external connection electrode 9A are provided on the second surface 7b. The first external connection electrode 9A is connected to the first power feeding electrode 8A. The power feeding member 6 is a flexible printed circuit board.

The first power feeding electrode 8A and the second power feeding electrode 8B are not in contact with each other and are electrically insulated from each other. Similarly, the first external connection electrode 9A and the second external connection electrode 9B are not in contact with each other and are electrically insulated from each other. Further, the first external connection electrode 9A and the second external connection electrode 9B are connected to different potentials. Therefore, the first power feeding electrode 8A and the second power feeding electrode 8B are connected to the different potentials.

The present preferred embodiment is characterized in that, as illustrated in FIG. 3, the substrate 7 of the power feeding member 6 is bent so as to sandwich the piezoelectric element 4 in the thickness direction and the first power feeding electrode 8A and the second power feeding electrode 8B are joined to the first main surface 4a or the second main surface 4b of the piezoelectric element 4. Portions of the substrate 7 that are not located on the first main surface 4a and the second main surface 4b of the piezoelectric element 4 are bent. As a result, the reliability of a wiring joint can be improved, and vibration performance can be improved. Details of these advantageous effects will be described below together with details of the configuration of the power feeding member 6.

As illustrated in FIG. 4, the substrate 7 includes a plurality of arc-shaped portions. More particularly, the substrate 7 includes a first substantially semi-annular portion 7c and a second substantially semi-annular portion 7d. A direction connecting both ends of the first substantially semi-annular portion 7c is parallel or substantially parallel to a direction connecting both ends of the second substantially semi-annular portion 7d. In the present specification, when the power feeding member does not have an annular portion, the radial direction of a virtual circle including the substantially semi-annular portions and the like is defined as the radial direction of the power feeding member. The first substantially semi-annular portion 7c and the second substantially semi-annular portion 7d are not connected to each other and are shifted from each other in the radial direction. A first linear portion 7e extends outward in the radial direction from one end of the first substantially semi-annular portion 7c. Similarly, a second linear portion 7f extends outward in the radial direction from one end of the second substantially semi-annular portion 7d. The first linear portion 7e and the second linear portion 7f are connected to each other and integrated with each other. This integral portion is a third linear portion 7g.

The second power feeding electrode 8B is provided on the second substantially semi-annular portion 7d on the first surface 7a of the substrate 7. The second external connection electrode 9B is provided on the second linear portion 7f and the third linear portion 7g on the first surface 7a. As illustrated in FIG. 5, the first power feeding electrode 8A is provided on the first substantially semi-annular portion 7c on the second surface 7b. The first external connection electrode 9A is provided on the first linear portion 7e and the third linear portion 7g on the second surface 7b. In the present preferred embodiment, the first power feeding electrode 8A and the first external connection electrode 9A are integrally provided. Similarly, the second power feeding electrode 8B and the second external connection electrode 9B are integrally provided.

Figure 6:
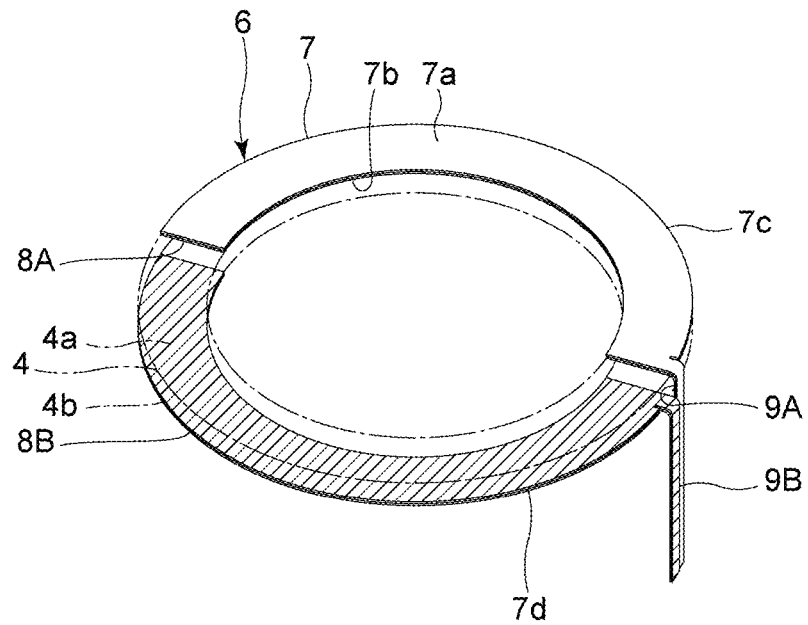
FIG. 6 is a perspective view of the power feeding member in the first preferred embodiment of the present invention.

FIG. 6 is a perspective view of the power feeding member in the first preferred embodiment. Virtual curves in FIG. 6 indicate the piezoelectric element 4 sandwiched by the power feeding member 6 and joined to the power feeding member 6.

The substrate 7 of the power feeding member 6 sandwiches the piezoelectric element 4 between the first substantially semi-annular portion 7c and the second substantially semi-annular portion 7d. The first substantially semi-annular portion 7c corresponds to a first sandwiching portion, and the second substantially semi-annular portion 7d corresponds to a second sandwiching portion.

The first power feeding electrode 8A is joined to the first main surface 4a of the piezoelectric element 4. More specifically, the first power feeding electrode 8A is electrically connected to the first electrode 14A of the piezoelectric element 4. As described above, in the present preferred embodiment, the first sandwiching portion has the substantially semi-annular shape. Therefore, an approximately half portion of the first main surface 4a is covered with the power feeding member 6, and the other portion thereof is not covered with the power feeding member 6. An approximately half portion of the piezoelectric element 4 is thereby indirectly joined to the cylindrical body 3 with the power feeding member 6 interposed therebetween. The other portion of the piezoelectric element 4 is directly joined to the cylindrical body 3. The cylindrical body 3 is joined to the piezoelectric element 4 and the power feeding member 6 with an adhesive layer.

The second power feeding electrode 8B is joined to the second main surface 4b of the piezoelectric element 4. More specifically, the second power feeding electrode 8B is electrically connected to the second electrode 14B of the piezoelectric element 4. An approximately half portion of the second main surface 4b is covered with the power feeding member 6, and the other portion thereof is not covered with the power feeding member 6. In the present preferred embodiment, the first power feeding electrode 8A is preferably joined to the first electrode 14A with a conductive adhesive layer, for example. The second power feeding electrode 8B is preferably joined to the second electrode 14B with a conductive adhesive layer, for example.

The first external connection electrode 9A and the second external connection electrode 9B are led-out from the outer circumferential edge side of the piezoelectric element 4. The substrate 7 of the power feeding member 6 is bent at a portion where the first external connection electrode 9A is provided and at a portion where the second external connection electrode 9B is provided. The bent portions of the substrate 7 correspond to the first linear portion 7e and the second linear portion 7f illustrated in FIG. 4. With this bending, the first external connection electrode 9A and the second external connection electrode 9B are also bent. More specifically, the power feeding member 6 is bent at a portion in the vicinity of the boundary between the first external connection electrode 9A and the first power feeding electrode 8A and at a portion in the vicinity of the boundary between the second external connection electrode 9B and the second power feeding electrode 8B. An angle between the portion of the second surface 7b of the substrate 7 where the first power feeding electrode 8A is provided and the direction in which the first external connection electrode 9A extends is about 90°, for example. Similarly, an angle between the portion of the first surface 7a where the second power feeding electrode 8B is provided and the direction in which the second external connection electrode 9B extends is about 90°, for example. However, the above-described angles are not limited to about 90°.

The first external connection electrode 9A is led-out while passing through the side surface of the piezoelectric element 4. It is preferable that the second electrode 14B of the piezoelectric element 4 does not extend to the outer circumferential edge of the piezoelectric body 13 in a portion where the first external connection electrode 9A is in contact with the piezoelectric element 4. This makes it difficult for the second electrode 14B and the first external connection electrode 9A to come into contact with each other. A non-limiting example of a method of sandwiching the piezoelectric element 4 by the power feeding member 6 will be described with reference to FIGS. 7A to 7C.

Figure 7A:
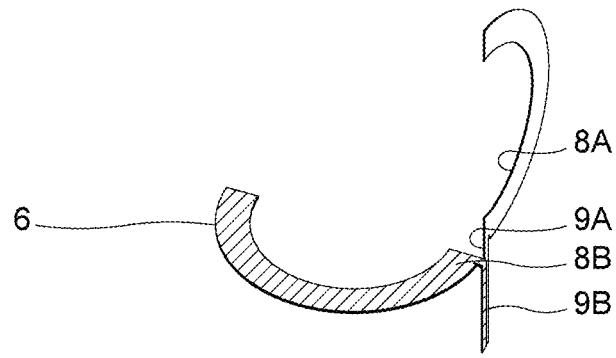
FIGS. 7A to 7C are views illustrating an example of a method of sandwiching the piezoelectric element by the power feeding member in the first preferred embodiment of the present invention.
Figure 7B:
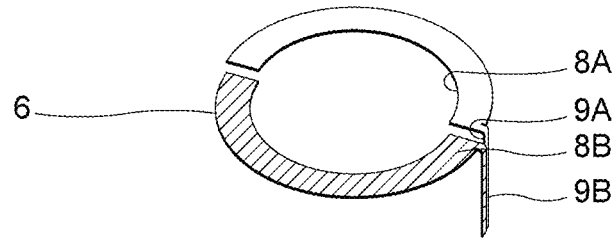
Figure 7C:
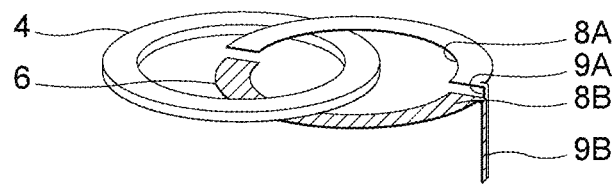

FIGS. 7A to 7C are views illustrating an example of the method of sandwiching the piezoelectric element by the power feeding member in the first preferred embodiment.

A portion of the power feeding member 6, which is in the vicinity of the boundary between the second external connection electrode 9B and the second power feeding electrode 8B, is bent as illustrated in FIG. 7A from the state illustrated in FIG. 4. Then, a portion of the power feeding member 6, which is in the vicinity of the boundary between the first external connection electrode 9A and the first power feeding electrode 8A, is bent as illustrated in FIG. 7B. In this case, a space to sandwich the piezoelectric element 4 is provided in the power feeding member 6. Subsequently, the piezoelectric element 4 is sandwiched by the power feeding member 6 as illustrated in FIG. 7C. Thereafter, the piezoelectric element 4 and the power feeding member 6 are joined together. However, this sandwiching method is an example. For example, the piezoelectric element 4 may be mounted and joined from above after the state illustrated in FIG. 7A, and then, the power feeding member 6 may be bent and joined as illustrated in FIG. 7B.

In the present preferred embodiment, the approximately half portion of the first main surface 4a of the piezoelectric element 4 and the first power feeding electrode 8A of the power feeding member 6 are joined to each other on the surfaces. Similarly, the approximately half portion of the second main surface 4b and the second power feeding electrode 8B are joined to each other on the surfaces. Therefore, joint force between the piezoelectric element 4 and the power feeding member 6 can be increased. In addition, the first external connection electrode 9A and the second external connection electrode 9B are portions of the flexible printed circuit board as the power feeding member 6. Thus, the present preferred embodiment does not include a configuration in which the first external connection electrode 9A and the second external connection electrode 9B are independently connected to the piezoelectric element 4. It is therefore unlikely that the wiring joint will be weak. Accordingly, the reliability of the wiring joint can be improved.

Further, hereinafter, improvement of the vibration performance in the present preferred embodiment is described by comparing the present preferred embodiment with a first comparative example.

Figure 8:
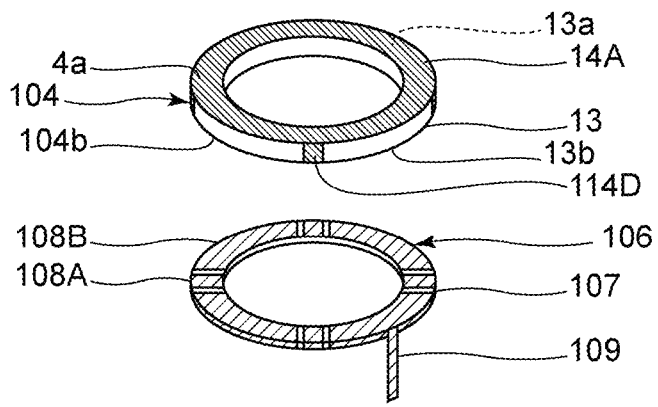
FIG. 8 is an exploded perspective view of a piezoelectric element and a power feeding member in a first comparative example.

FIG. 8 is an exploded perspective view of a piezoelectric element and a power feeding member in the first comparative example.

As illustrated in FIG. 8, in the first comparative example, the arrangement of electrodes in a piezoelectric element 104 and the configuration of a power feeding member 106 are different from those in the first preferred embodiment. A substrate 107 of the power feeding member 106 includes one annular portion. A plurality of first power feeding electrodes 108A and a plurality of second power feeding electrodes 108B are provided on the substrate 107. More specifically, the plurality of second power feeding electrodes 108B are provided in the above-described annular portion so as to be dispersed in the circumferential direction. The respective first power feeding electrodes 108B are provided between portions of the substrate 107 where the plurality of second power feeding electrodes 108A are provided. Note that the plurality of first power feeding electrodes 108A and the plurality of second power feeding electrodes 108B extend to the back surface of the substrate 107. Each electrode is appropriately connected to an external connection electrode 109 by wiring provided on the back surface of the substrate 107. Note that the external connection electrode 109 includes two electrodes connected to different potentials.

The first electrode 14A similar to that in the first preferred embodiment is provided on the first surface 13a of the piezoelectric body 13 in the piezoelectric element 104. A plurality of electrodes are provided on the second surface 13b. The arrangement of the plurality of electrodes corresponds to the arrangement of the plurality of first power feeding electrodes 108A and the plurality of second power feeding electrodes 108B of the power feeding member 106. A plurality of side surface electrodes 114D are provided on the side surface of the piezoelectric body 13. In the piezoelectric element 104, the electrodes connected to the first power feeding electrodes 108A are connected to the side surface electrodes 114D. The side surface electrodes 114D are connected to the first electrode 14A.

For a vibration device using the piezoelectric element 104 and the power feeding member 106 in the first comparative example and the vibration device 1 in the first preferred embodiment, maximum displacement amounts of the light-transmissive cover 2 were compared. As a result, the maximum displacement amount in the first comparative example was about 7.4 μm, and the maximum displacement amount in the first preferred embodiment was about 8.6 μm. Thus, the maximum displacement amount in the first preferred embodiment is larger than the maximum displacement amount in the first comparative example, as described above.

In the first comparative example, the power feeding member 106 is joined only to the second main surface 104b of the piezoelectric element 104. Therefore, the configuration of the electrodes in a portion of the power feeding member 106, which is electrically connected to the piezoelectric element 104, is complicated. The symmetry and uniformity of distribution of stress that is applied to the piezoelectric body 13 and distribution of displacement of the piezoelectric body 13 are deteriorated. As a result, the efficiency of vibration of the light-transmissive cover 2 is reduced.

On the other hand, in the first preferred embodiment, as illustrated in FIG. 3, the power feeding member 6 is joined to both of the first main surface 4a and the second main surface 4b of the piezoelectric element 4. Thus, the configuration of the electrodes in the portion of the power feeding member 6, which is joined to the piezoelectric element 4, can be simplified. More specifically, the configuration of the electrodes in the portion of the power feeding member 6, which is joined to the piezoelectric element 4, is a simple configuration in which one first power feeding electrode 8A and one second power feeding electrode 8B are provided. The symmetry and uniformity of the distribution of the stress that is applied to the piezoelectric body 13 and the distribution of the displacement of the piezoelectric body 13 are therefore improved. Accordingly, the efficiency of the vibration of the light-transmissive cover 2 is improved.

Figure 9:
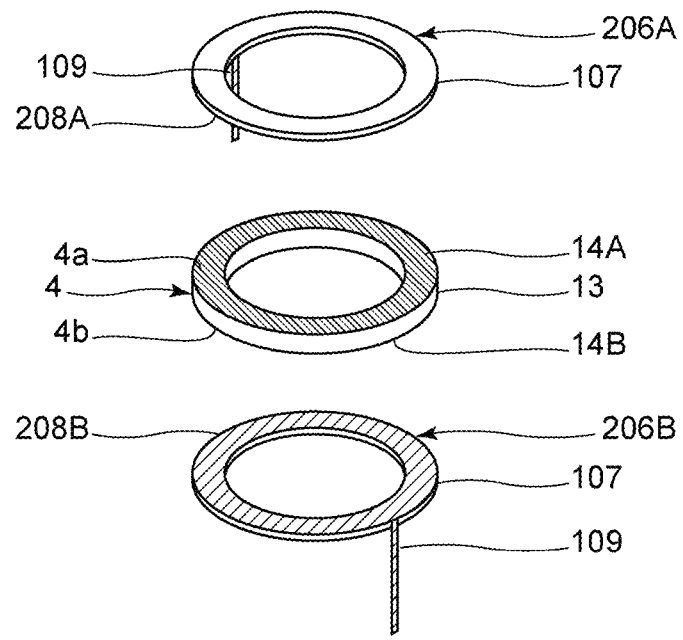
FIG. 9 is an exploded perspective view of a piezoelectric element and a power feeding member in a second comparative example.

Further, for the vibration device 1 in the first preferred embodiment and a second comparative example, the maximum displacement amounts of the light-transmissive cover 2 were compared. In the second comparative example, as illustrated in FIG. 9, two power feeding members 206A and 206B are joined to the piezoelectric element 4. In the power feeding member 206A and the power feeding member 206B, the same substrates 107 as that in the first comparative example are used. In the power feeding member 206A, an annular power feeding electrode 208A is provided on an annular portion of the substrate 107. The power feeding electrode 208A is joined to the first electrode 14A of the piezoelectric element 4. On the other hand, in the power feeding member 206B, an annular power feeding electrode 208B is provided on an annular portion of the substrate 107. The power feeding electrode 208B is joined to the second electrode 14B.

In a vibration device using the piezoelectric element 4, the power feeding member 206A, and the power feeding member 206B in the second comparative example, the maximum displacement amount of the light-transmissive cover 2 was about 8.8 μm. As described above, the maximum displacement amount in the first preferred embodiment was about 8.6 μm. In the first preferred embodiment, usage of only one power supply member 6 enables the maximum displacement amount to be the same or substantially the same as that in the second comparative example using two power feeding members 206A and 206B. As described above, in the first preferred embodiment, the vibration efficiency can be increased, and productivity can also be increased.

As illustrated in FIG. 6, in the first preferred embodiment, the first substantially semi-annular portion 7c of the substrate 7 as the first sandwiching portion covers the approximately half of the first main surface 4a of the piezoelectric element 4. Similarly, the second substantially semi-annular portion 7d as the second sandwiching portion covers the approximately half of the second main surface 4b. Here, the direction around the opening 4e of the piezoelectric element 4 is defined as a circumferential direction. The first sandwiching portion and the second sandwiching portion preferably cover, for example, equal to or more than about one third of the circumference of the piezoelectric element 4 in the circumferential direction. It is more preferable that the first sandwiching portion and the second sandwiching portion cover, for example, equal to or more than about one half of the circumference of the piezoelectric element 4. Further, it is preferable that the first power feeding electrode 8A and the second power feeding electrode 8B are joined, for example, to a portion of equal to or more than about one third of the circumference of the piezoelectric element 4 in the circumferential direction. It is more preferable that the first power feeding electrode 8A and the second power feeding electrode 8B are joined, for example, to a portion of equal to or more than about one half of the piezoelectric element 4. With such a joint structure, it is possible to more reliably increase the joint force between the piezoelectric element 4 and the power feeding member 6, and to more reliably improve the reliability of the wiring joint.

Hereinafter, the configuration of the holding member 5 will be described in detail. As illustrated in FIG. 1, the holding member 5 includes the spring portion 17 and the bottom portion 18. The spring portion 17 has a shape in which two cylindrical shapes are connected in a stepped manner. More specifically, the spring portion 17 includes a first portion 17a, a second portion 17b, and a third portion 17c. The first portion 17a and the third portion 17c have cylindrical or substantially cylindrical shapes. The first portion 17a and the third portion 17c extend in the axial direction Z. The second portion 17b has an annular shape. The second portion 17b connects the first portion 17a and the third portion 17c. The first portion 17a is connected to the cylindrical body 3. The bottom portion 18 is continuous to the third portion 17c. The outer diameter of the first portion 17a is smaller than the outer diameter of the third portion 17c.

The thickness along the direction orthogonal or substantially orthogonal to the direction in which each portion of the holding member 5 extends is defined as the thickness of each portion of the holding member 5. In the holding member 5, the thickness of the spring portion 17 is smaller than the thickness of the bottom portion 18. Accordingly, the spring portion 17 is more easily deformed than the bottom portion 18. Thus, a radial component of vibration is absorbed by a spring property of the spring portion 17. The above-described absorption of the vibration by the spring portion 17 means that most of the vibration propagated from the piezoelectric element 4 to the holding member 5 can be the vibration in the spring portion 17. This makes it difficult for the vibration to leak to the bottom portion 18.

In addition, since the thickness of the bottom portion 18 is relatively large, the bottom portion 18 itself is hardly deformed. Leakage of the vibration to the bottom portion 18 of the holding member 5 can therefore be effectively reduced or prevented. Accordingly, when the bottom portion 18 is fixed to the outside or the like, vibration damping can be effectively reduced or prevented.

The shape of the holding member 5 is not limited to the above. For example, the outer diameter of the third portion 17c of the spring portion 17 may be smaller than the outer diameter of the first portion 17a. Alternatively, the spring portion 17 may not include the first portion 17a, the second portion 17b, and the third portion 17c. The cross-sectional shape of the spring portion 17 along the axial direction Z may be, for example, a linear shape.

As described above, the piezoelectric element 4 illustrated in FIG. 3 has the annular shape. In the present preferred embodiment, the direction orthogonal or substantially orthogonal to the thickness direction of the piezoelectric element 4 is the radial direction of the piezoelectric element 4. The piezoelectric element 4 includes an inner edge 4c positioned on the inner side in the radial direction and an outer edge 4d positioned on the outer side in the radial direction. The direction connecting the inner edge 4c and the outer edge 4d of the piezoelectric element 4 is defined as a width direction of the piezoelectric element 4. The first power feeding electrode 8A of the power feeding member 6 is joined to the first main surface 4a of the piezoelectric element 4, and the second power feeding electrode 8B thereof is joined to the second main surface 4b. Therefore, also in the first power feeding electrode 8A and the second power feeding electrode 8B, the direction connecting the inner edge 4c and the outer edge 4d is defined as a width direction.

In the present preferred embodiment, the width of the first power feeding electrode 8A and the width of the second power feeding electrode 8B are the same or substantially the same as the width of the piezoelectric element 4. However, the width of at least one of the first power feeding electrode 8A and the second power feeding electrode 8B may be smaller than the width of the piezoelectric element 4.

Figure 10:
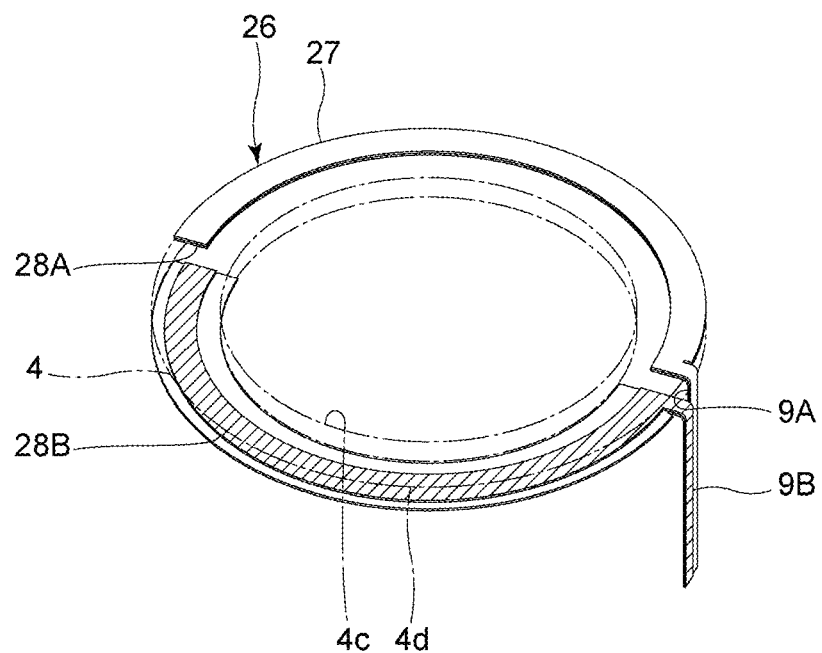
FIG. 10 is a perspective view of a power feeding member in a second preferred embodiment of the present invention.

FIG. 10 is a perspective view of a power feeding member according to a second preferred embodiment of the present invention.

The present preferred embodiment differs from the first preferred embodiment in that the widths of a first power feeding electrode 28A and a second power feeding electrode 28B are smaller than the width of the piezoelectric element 4 and in a portion of a configuration of a substrate 27. Except for the above points, a vibration device in the present preferred embodiment has the same or similar configuration as that of the vibration device 1 in the first preferred embodiment.

The first power feeding electrode 28A extends to the outer edge 4d of the piezoelectric element 4 and does not extend to the inner edge 4c of the piezoelectric element 4. On the other hand, the second power feeding electrode 28B does not extend to either of the inner edge 4c and the outer edge 4d of the piezoelectric element 4. The width of a portion of the substrate 27 where the first power feeding electrode 28A is provided is the same or substantially the same as the width of the first power feeding electrode 28A. On the other hand, the width of a portion of the substrate 27 where the second power feeding electrode 28B is provided is the same or substantially the same as the width of the piezoelectric element 4. However, the width of the portion of the substrate 27 where the first power feeding electrode 28A is provided may be the same or substantially the same as the width of the piezoelectric element 4. Alternatively, the width of the portion of the substrate 27 where the second power feeding electrode 28B is provided may be the same or substantially the same as the width of the second power feeding electrode 28B.

Also in the present preferred embodiment, the joint area of a power feeding member 26 and the piezoelectric element 4 large, and the first external connection electrode 9A and the second external connection electrode 9B are portions of a flexible printed circuit board as the power feeding member 26. Further, the configuration of the electrodes in a portion where the power feeding member 26 is joined to the piezoelectric element 4 is a simple configuration in which one first power feeding electrode 28A and one second power feeding electrode 28B are provided. Therefore, similar to the first preferred embodiment, the reliability of the wiring joint can be improved, and vibration performance can be improved.

Figure 11:
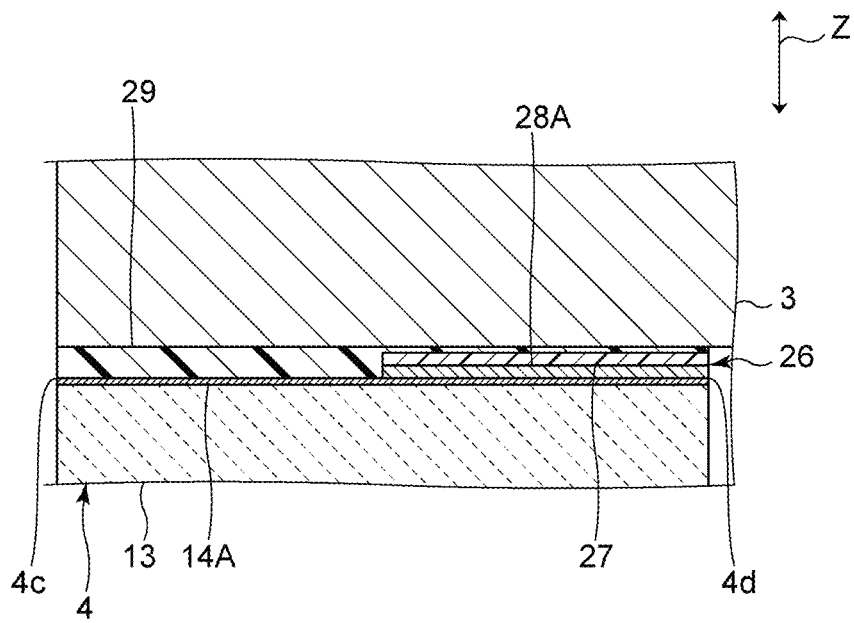
FIG. 11 is a front cross-sectional view illustrating the vicinity of a piezoelectric element, a first power feeding electrode, and a cylindrical body in the second preferred embodiment of the present invention.

FIG. 11 is a front cross-sectional view illustrating the vicinity of the piezoelectric element, the first power feeding electrode, and the cylindrical body in the second preferred embodiment.

The piezoelectric element 4 includes a portion directly joined to the cylindrical body 3 and a portion indirectly joined thereto. More specifically, the piezoelectric element 4 is indirectly joined to the cylindrical body 3 with the power feeding member 26 interposed therebetween at a portion where the power feeding member 26 is provided. On the other hand, the piezoelectric element 4 is directly joined to the cylindrical body 3 at a portion where the power feeding member 26 is not provided. An adhesive layer 29 is provided between the cylindrical body 3 and the piezoelectric element 4 and between the cylindrical body 3 and the power feeding member 26. The cylindrical body 3 is joined to the piezoelectric element 4 and the power feeding member 26 with the adhesive layer 29.

Figure 12:
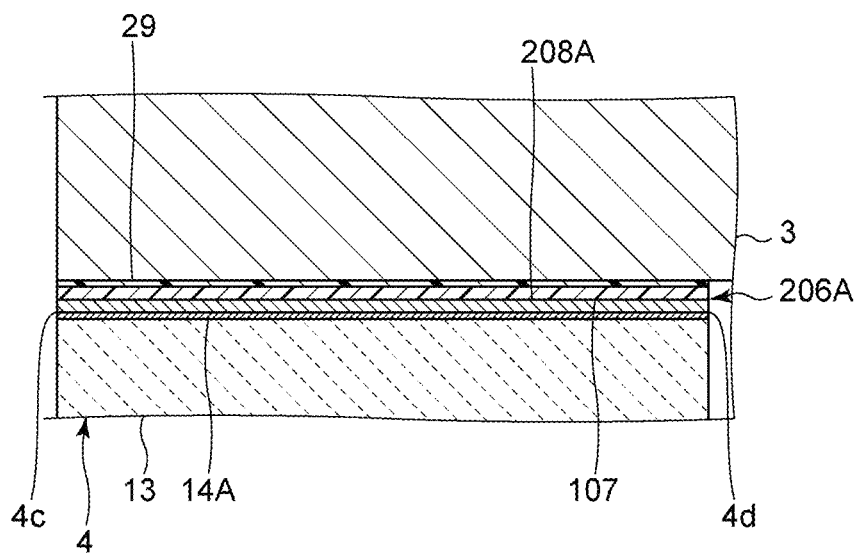
FIG. 12 is a front cross-sectional view illustrating the vicinity of the piezoelectric element, a first power feeding electrode, and a cylindrical body in the second comparative example.

The thickness of a portion of the adhesive layer 29, which is located between the cylindrical body 3 and the piezoelectric element 4, is larger than the thickness of a portion thereof which is located between the cylindrical body 3 and the power feeding member 26. On the other hand, as illustrated in FIG. 12, in the above-described second comparative example, the thickness of the adhesive layer 29 is uniform or substantially uniform in the radial direction. For the second preferred embodiment and the second comparative example, maximum principal stresses applied to a joint interface between the cylindrical body 3 and the piezoelectric element 4 were compared.

Figure 13:
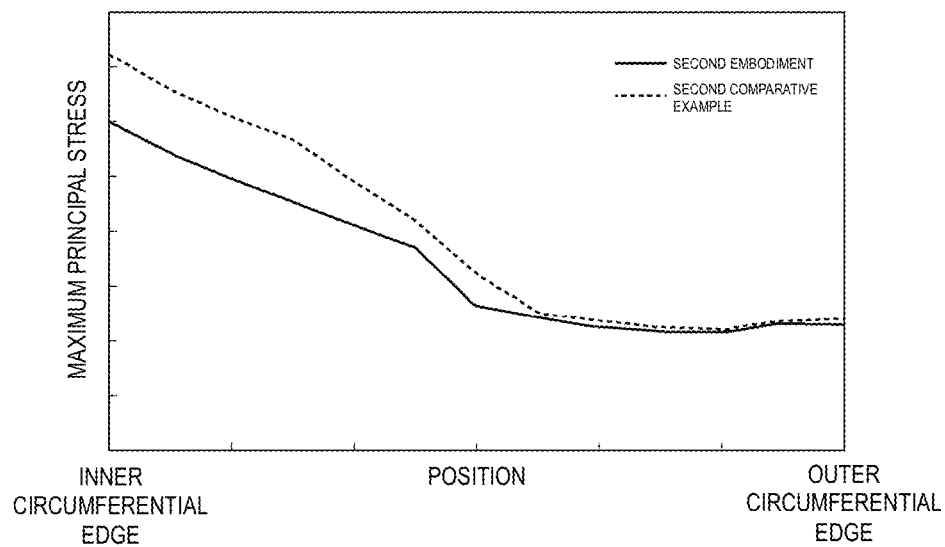
FIG. 13 is a graph illustrating a relationship between a position of the piezoelectric element in the radial direction and a maximum principal stress that is applied to a joint interface between the cylindrical body and the piezoelectric element in the second preferred embodiment of the present invention and the second comparative example.
Figure 14:
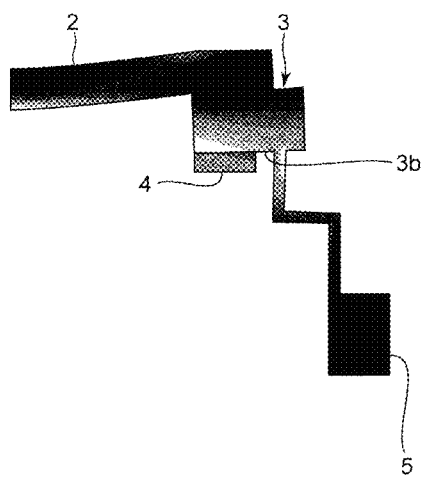
FIG. 14 is a stress distribution diagram illustrating an example of stress distribution in the vibration device.

FIG. 13 is a graph illustrating a relationship between a position of the piezoelectric element in the radial direction and the maximum principal stress that is applied to the joint interface between the cylindrical body and the piezoelectric element in the second preferred embodiment and the second comparative example. FIG. 14 is a stress distribution diagram illustrating an example of stress distribution in the vibration device. FIG. 14 illustrates a portion corresponding to half, in the radial direction, of the cross section of the vibration device along the axial direction Z.

As illustrated in FIG. 13, in the second preferred embodiment, it is seen that the maximum principal stress applied to the joint interface between the cylindrical body 3 and the piezoelectric element 4 is smaller over the entire region in the radial direction than that in the second comparative example. In the second preferred embodiment, the above-described maximum principal stress can be smaller than that in the second comparative example particularly on the inner side in the radial direction. The reason for this is as follows.

As illustrated in FIG. 14, the stress that is applied to the joint interface between the cylindrical body 3 and the piezoelectric element 4 is particularly large on the inner side in the radial direction. On the other hand, in the second preferred embodiment, the thickness of the adhesive layer 29 is large on the inner side in the radial direction. This makes it possible to effectively moderate the stress that is applied to the joint interface between the cylindrical body 3 and the piezoelectric element 4 on the inner side in the radial direction. The maximum principal stress that is applied to the joint interface can therefore be reduced as illustrated in FIG. 13. Accordingly, in the present preferred embodiment, breakage of the joint interface is less likely to occur, and the vibration device is less likely to be damaged.

Note that the arrangement of the first power feeding electrode 28A and the second power feeding electrode 28B is not limited to the above. Hereinafter, a first variation and a second variation of the second preferred embodiment in which the arrangement of the first power feeding electrode 28A and the second power feeding electrode 28B is different from that in the second preferred embodiment will be described. Also in the first variation and the second variation, similar to the second preferred embodiment, it is possible to improve the reliability of the wiring joint and to improve the vibration performance.

Figure 15:
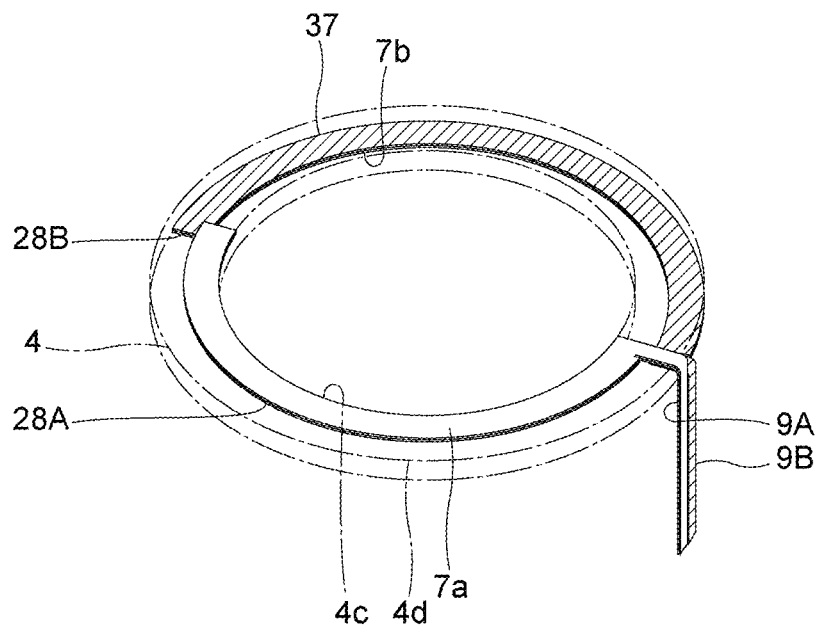
FIG. 15 is a perspective view of a power feeding member in a first variation of the second preferred embodiment of the present invention.

In the first variation illustrated in FIG. 15, the first power feeding electrode 28A extends to the inner edge 4c of the piezoelectric element 4 but does not extend to the outer edge 4d. On the other hand, the second power feeding electrode 28B extends to the outer edge 4d of the piezoelectric element 4 and does not extend to the inner edge 4c. Note that the width of a portion of a substrate 37 where the second power feeding electrode 28B is provided is the same or substantially the same as the width of the second power feeding electrode 28B.

Figure 16:
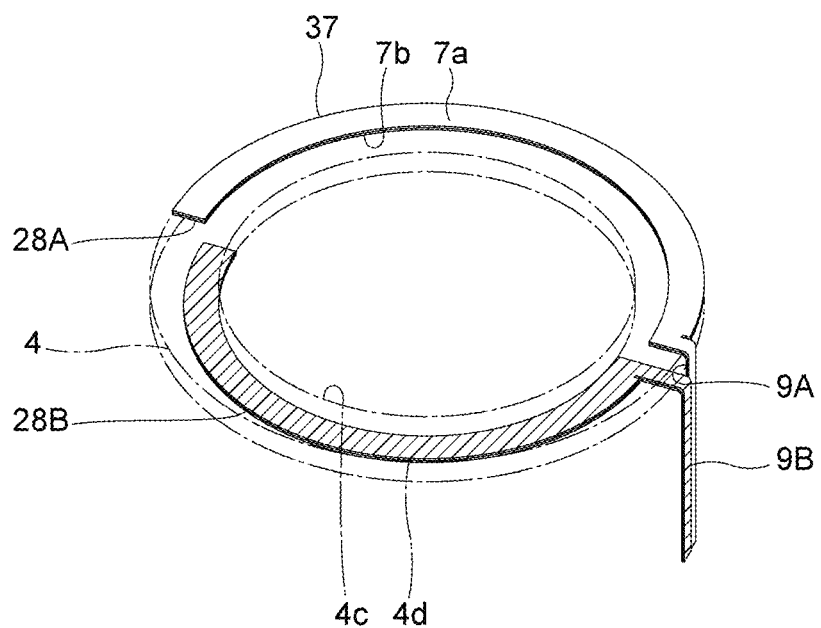
FIG. 16 is a perspective view of a power feeding member in a second variation of the second preferred embodiment of the present invention.

In the second variation illustrated in FIG. 16, the second power feeding electrode 28B extends to the inner edge 4c of the piezoelectric element 4 but does not extend to the outer edge 4d. The first power feeding electrode 28A extends to the outer edge 4d of the piezoelectric element 4 and does not extend to the inner edge 4c. Therefore, the maximum principal stress that is applied to the joint interface between the piezoelectric element 4 and the cylindrical body 3 can be reduced.

Figure 17:
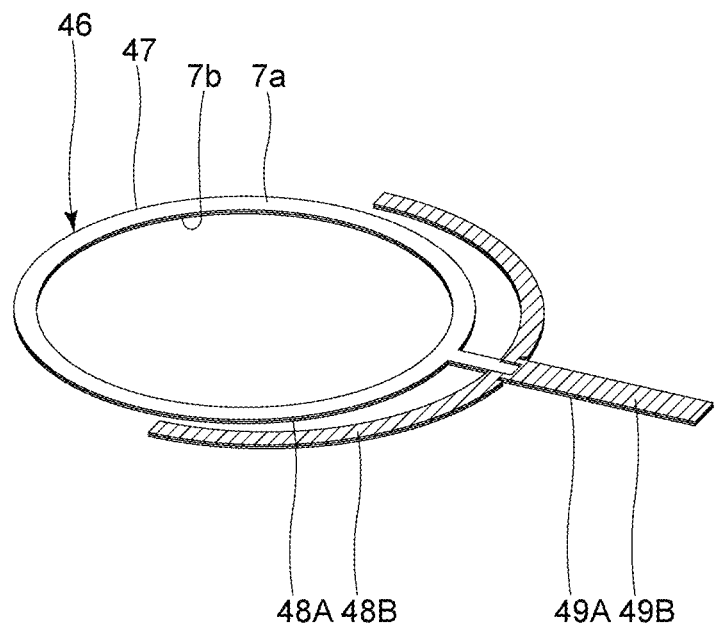
FIG. 17 is a perspective view illustrating a power feeding member on a first surface side of a substrate in an unbent state in a third preferred embodiment of the present invention.
Figure 18:
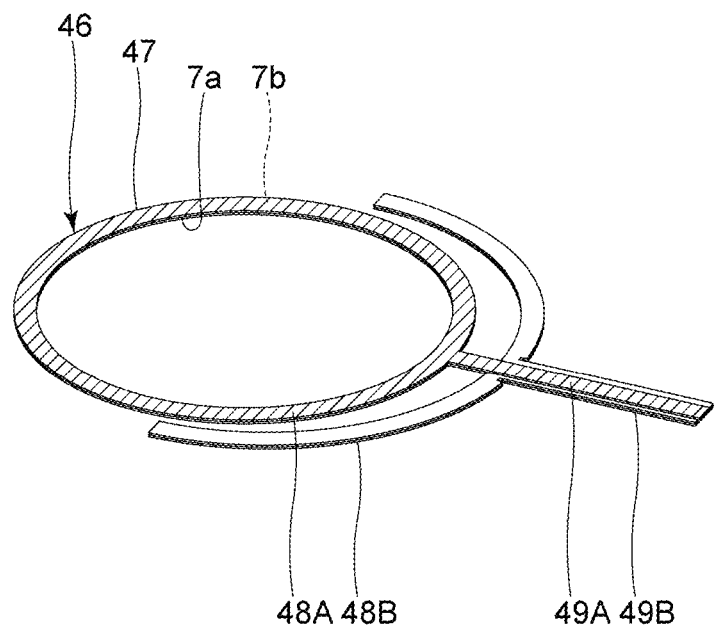
FIG. 18 is a perspective view illustrating the power feeding member on a second surface side of the substrate in the unbent state in the third preferred embodiment of the present invention.
Figure 19:
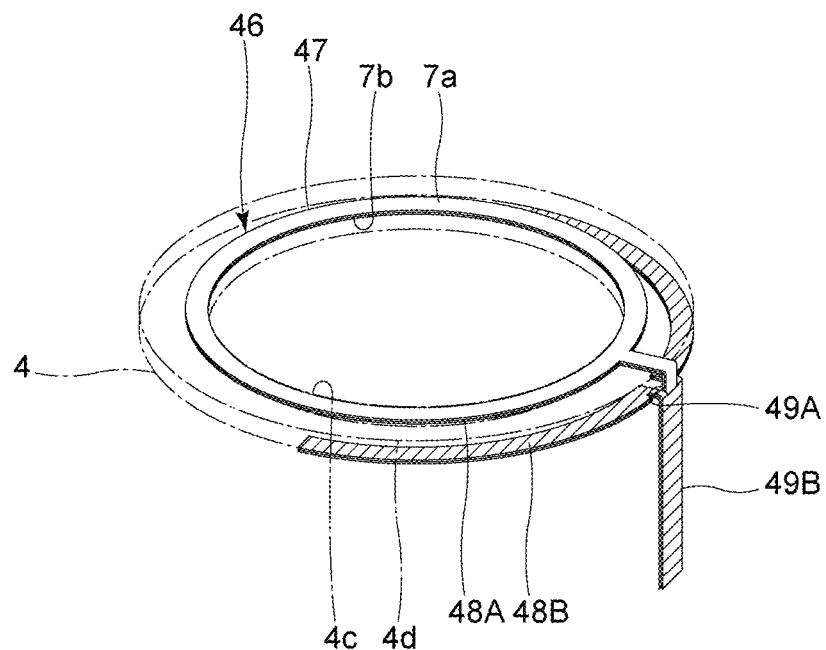
FIG. 19 is a perspective view of the power feeding member in the third preferred embodiment of the present invention.

FIG. 17 is a perspective view illustrating a power feeding member on the first surface side of a substrate in an unbent state according to a third preferred embodiment of the present invention. FIG. 18 is a perspective view illustrating the power feeding member on the second surface side of the substrate in the unbent state in the third preferred embodiment. FIG. 19 is a perspective view of the power feeding member in the third preferred embodiment.

As illustrated in FIG. 17, the present preferred embodiment differs from the first preferred embodiment in the configuration of a power feeding member 46. Except for the above points, a vibration device in the present preferred embodiment has the same or similar configuration as that of the vibration device 1 in the first preferred embodiment.

A substrate 47 of the power feeding member 46 includes one annular portion and one substantially semi-annular portion. A linear portion extends outward in the radial direction from the annular portion. The linear portion is connected to the center or approximate center of the substantially semi-annular portion. Further, a linear portion extends outward in the radial direction from the center or approximate center of the substantially semi-annular portion.

A second power feeding electrode 48B is provided on the substantially semi-annular portion on the first surface 7a of the substrate 47. More specifically, the second power feeding electrode 48B is provided in a portion of the substantially semi-annular portion other than the central portion thereof. A second external connection electrode 49B is provided on the linear portion on the first surface 7a. As illustrated in FIG. 18, a first power feeding electrode 48A is provided in the annular portion on the second surface 7b. A first external connection electrode 49A is provided on the linear portion on the second surface 7b. In the present preferred embodiment, the first power feeding electrode 48A and the first external connection electrode 49A are integrally provided to define a unitary structure. Similarly, the second power feeding electrode 48B and the second external connection electrode 49B are integrally provided to define a unitary structure.

As illustrated in FIG. 19, the substrate 47 of the power feeding member 46 is bent so as to sandwich the piezoelectric element 4 in the thickness direction. The first external connection electrode 49A and the second external connection electrode 49B are also bent. In this state, the power feeding member 46 is joined to the piezoelectric element 4. In the substantially semi-annular portion of the power feeding member 46, a central portion is separated from other portions. The piezoelectric element 4 can thus preferably be sandwiched in the thickness direction by the power feeding member 46. In the substrate 47 of the power feeding member 46, the first sandwiching portion has the annular shape, and the second sandwiching portion has the substantially semi-annular shape.

Also in the present preferred embodiment, the first power feeding electrode 48A, the first external connection electrode 49A, the second power feeding electrode 48B, and the second external connection electrode 49B are provided on the same substrate 47. In addition, the configuration of the electrodes in the portion of the power feeding member 46, which is joined to the piezoelectric element 4, is simple. Accordingly, similarly to the first preferred embodiment, the reliability of the wiring joint can be improved, and vibration performance can be improved.

The widths of the first power feeding electrode 48A and the second power feeding electrode 48B are smaller than the width of the piezoelectric element 4. The first power feeding electrode 48A extends to the inner edge 4c of the piezoelectric element 4 and does not extend to the outer edge 4d. On the other hand, the second power feeding electrode 48B extends to the outer edge 4d of the piezoelectric element 4 and does not extend to the inner edge 4c. However, arrangement of the first power feeding electrode 48A and the second power feeding electrode 48B is not limited to the above. Alternatively, the widths of the first power feeding electrode 48A and the second power feeding electrode 48B may be the same or substantially the same as the width of the piezoelectric element 4.

Figure 20:
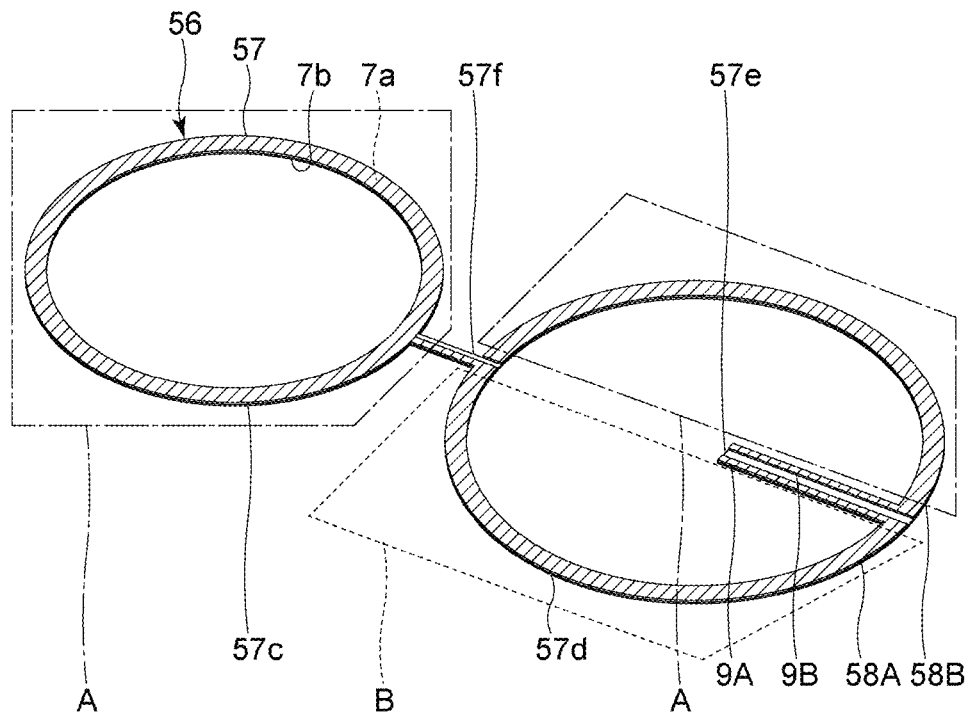
FIG. 20 is a perspective view of a power feeding member in an unbent state in a fourth preferred embodiment of the present invention.
Figure 21:
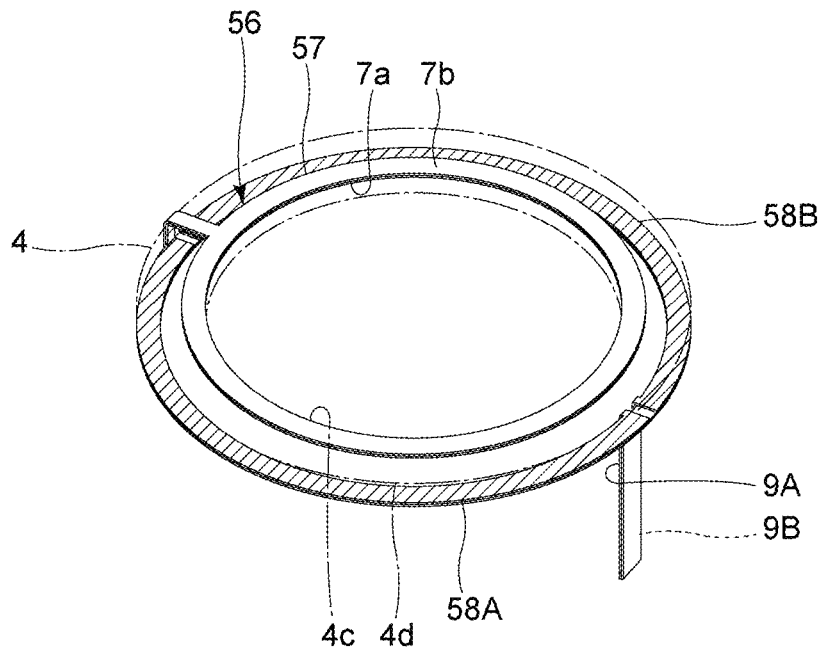
FIG. 21 is a perspective view of the power feeding member in the fourth preferred embodiment of the present invention.

FIG. 20 is a perspective view of a power feeding member in an unbent state according to a fourth preferred embodiment of the present invention. FIG. 21 is a perspective view of the power feeding member in the fourth preferred embodiment.

As illustrated in FIG. 20, the present preferred embodiment differs from the first preferred embodiment in the configuration of a power feeding member 56. Except for the above points, a vibration device in the present preferred embodiment has the same or similar configuration as that of the vibration device 1 in the first preferred embodiment.

A substrate 57 of the power feeding member 56 includes a first annular portion 57c and a second annular portion 57d. The first annular portion 57c is located in an outer side portion of the second annular portion 57d in the radial direction. A first linear portion 57e extends inward in the radial direction from the second annular portion 57d. Further, a second linear portion 57f extends outward in the radial direction from the second annular portion 57d. The second linear portion 57f is connected to the first annular portion 57c. The first linear portion 57e and the second linear portion 57f extend from different portions of the second annular portion 57d. The first linear portion 57e is located on an extension line of the second linear portion 57f. However, the positional relationship between the first linear portion 57e and the second linear portion 57f is not limited to the above.

A first power feeding electrode 58A is provided on the first annular portion 57c, the second annular portion 57d, and the first linear portion 57e on the first surface 7a of the substrate 57. More specifically, a portion of the first power feeding electrode 58A, which is provided on the first annular portion 57c, has an annular shape. A portion of the first power feeding electrode 58A, which is provided on the first linear portion 57e, has a linear shape. A portion of the first power feeding electrode 58A, which is provided on the second annular portion 57d, has a substantially semi-annular shape.

A second power feeding electrode 58B is provided on the second annular portion 57d on the first surface 7a. The second power feeding electrode 58B is not in contact with the first power feeding electrode 58A. The second power feeding electrode 58B has a substantially semi-annular shape. Further, the first external connection electrode 9A and the second external connection electrode 9B are provided on the second linear portion 57f on the first surface 7a. The first external connection electrode 9A and the second external connection electrode 9B are not in contact with each other. In the present preferred embodiment, the first power feeding electrode 58A and the first external connection electrode 9A are integrally provided as a unitary structure. Similarly, the second power feeding electrode 58B and the second external connection electrode 9B are integrally provided as a unitary structure.

As illustrated in FIG. 21, the substrate 57 of the power feeding member 56 is bent so as to sandwich the piezoelectric element 4 in the thickness direction. The first external connection electrode 9A and the second external connection electrode 9B are also bent. In this state, the power feeding member 56 is joined to the piezoelectric element 4. In the substrate 57 of the power feeding member 56, both of the first sandwiching portion and the second sandwiching portion have annular shapes. However, the shapes of the first sandwiching portion and the second sandwiching portion may be shapes that cover a portion of the piezoelectric element 4 in the circumferential direction.

In FIG. 20, the power feeding member 56 includes a first region A and a second region B. A portion of the first power feeding electrode 58A, which is provided on the first annular portion 57c, is included in the first region A. On the other hand, a portion of the first power feeding electrode 58A, which is provided on the second annular portion 57d, is included in the second region B. The second power feeding electrode 58B is included in the first region A. In the first region A, the power feeding member 56 is joined to the piezoelectric element 4 with a conductive adhesive layer. On the other hand, in the second region B, the power feeding member 56 is joined to the piezoelectric element 4 with an insulating adhesive layer. Thus, different voltages can preferably be applied to the first electrode 14A and the second electrode 14B of the piezoelectric element 4.

Also in the present preferred embodiment, the first power feeding electrode 58A, the first external connection electrode 9A, the second power feeding electrode 58B, and the second external connection electrode 9B are provided on the same substrate 57. In addition, the configuration of the electrodes in the portion of the power feeding member 56, which is joined to the piezoelectric element 4, is simple. Accordingly, similar to the first preferred embodiment, the reliability of the wiring joint can be improved, and vibration performance can be improved.

The widths of the first power feeding electrode 58A and the second power feeding electrode 58B are smaller than the width of the piezoelectric element 4. The first power feeding electrode 58A extends to the inner edge 4c of the piezoelectric element 4 and does not extend to the outer edge 4d. On the other hand, the second power feeding electrode 58B extends to the outer edge 4d of the piezoelectric element 4 and does not extend to the inner edge 4c. However, the arrangement of the first power feeding electrode 58A and the second power feeding electrode 58B is not limited to the above. Alternatively, the widths of the first power feeding electrode 58A and the second power feeding electrode 58B may be the same or substantially the same as the width of the piezoelectric element 4.

The structure of the electrical connection between the power feeding member and the piezoelectric element is not limited to the above. Hereinafter, a variation of the fourth preferred embodiment in which the structure of the electrical connection between the power feeding member and the piezoelectric element is different from that in the fourth preferred embodiment will be described. Also in this variation, similarly to the fourth preferred embodiment, it is possible to improve the reliability of the wiring joint and to improve the vibration performance.

Figure 22:
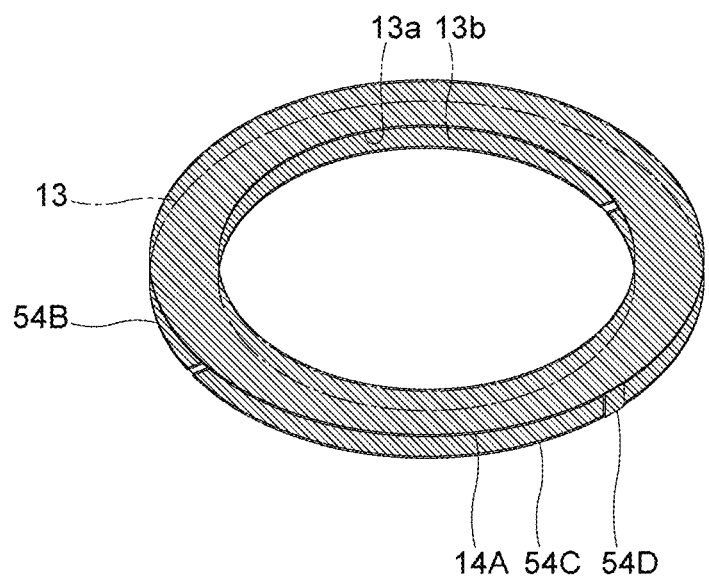
FIG. 22 is a perspective view illustrating an electrode structure of a piezoelectric element in a variation of the fourth preferred embodiment of the present invention.

FIG. 22 is a perspective view illustrating an electrode structure of a piezoelectric element in a variation of the fourth preferred embodiment.

The first electrode 14A similar to that in the fourth preferred embodiment is provided on the first surface 13a of the piezoelectric body 13. On the other hand, a second electrode 54B and a third electrode 54C are provided on the second surface 13b. The second electrode 54B and the third electrode 54C have substantially semi-annular shapes. The second electrode 54B and the third electrode 54C are not in contact with each other. Further, a side surface electrode 54D is provided on the side surface of the piezoelectric body 13. The first electrode 14A and the third electrode 54C are connected by the side surface electrode 54D.

In this variation, the first power feeding electrode 58A illustrated in FIG. 21 is joined to the first electrode 14A and the third electrode 54C with conductive adhesive layers. Therefore, the same or substantially the same voltage is applied to the first electrode 14A and the third electrode 54C. On the other hand, the second power feeding electrode 58B is joined to the second electrode 54B with a conductive adhesive layer. Therefore, a voltage that is different from that applied to the first electrode 14A and the third electrode 54C is applied to the second electrode 54B. Also in this case, the piezoelectric element can preferably be vibrated.

Figure 23:
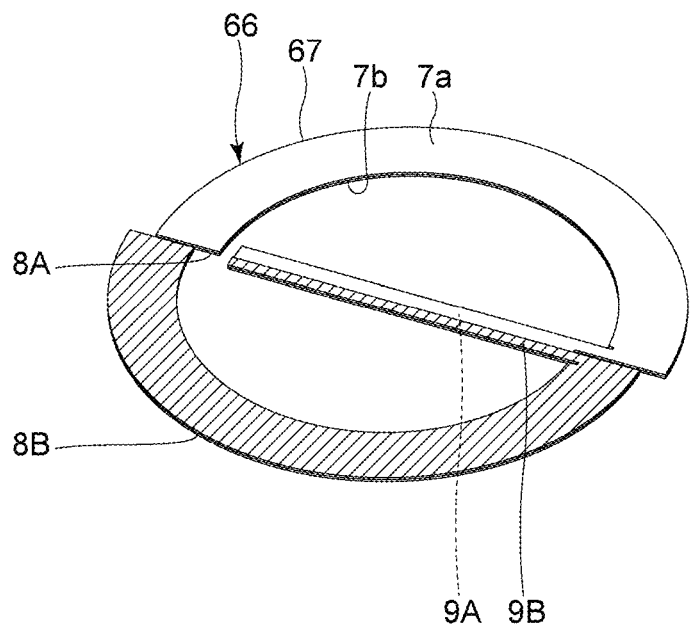
FIG. 23 is a perspective view of a power feeding member in an unbent state in a fifth preferred embodiment of the present invention.
Figure 24:
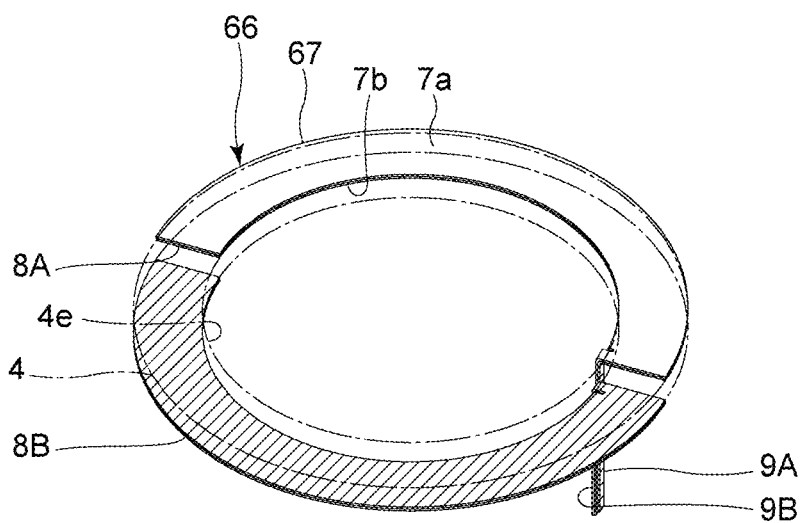
FIG. 24 is a perspective view of the power feeding member in the fifth preferred embodiment of the present invention.

FIG. 23 is a perspective view of a power feeding member in an unbent state according to a fifth preferred embodiment of the present invention. FIG. 24 is a perspective view of the power feeding member in the fifth preferred embodiment.

The present preferred embodiment differs from the first preferred embodiment in the direction in which the first external connection electrode 9A and the second external connection electrode 9B are led-out. Except for the above points, a vibration device in the present preferred embodiment has the same or similar configuration as that of the vibration device 1 in the first preferred embodiment.

A substrate 67 includes two substantially semi-annular portions similarly to the first preferred embodiment. A linear portion extends inward in the radial direction from one end of one substantially semi-annular portion. Similarly, a linear portion extends inward in the radial direction from one end of the other substantially semi-annular portion. Both linear portions are connected to each other and are integrated with each other as a unitary structure. The second external connection electrode 9B is provided on the linear portion on the first surface 7a of the substrate 67. The first external connection electrode 9A is provided on the linear portion on the second surface 7b.

Each of the linear portions of the substrate 67 extends inward in the radial direction. Therefore, the shape of the outer circumference of a power feeding member 66 in the unbent state is circular or substantially circular. A maximum value of the dimension of the shape of the above-described outer circumference along the radial direction is therefore small. Accordingly, when a plurality of substrates 67 are obtained from a base material of the substrates 67 in manufacturing the vibration device, the number of substrates 67 to be produced can be increased. Productivity can thus be increased.

As illustrated in FIG. 24, the substrate 67 of the power feeding member 66 is bent so as to sandwich the piezoelectric element 4 in the thickness direction. In this state, the power feeding member 66 is joined to the piezoelectric element 4. The first external connection electrode 9A and the second external connection electrode 9B are led-out from the opening 4e side of the piezoelectric element 4. Also in the present preferred embodiment, similar to the first preferred embodiment, it is possible to improve the reliability of the wiring joint and to improve vibration performance.

Figure 25:
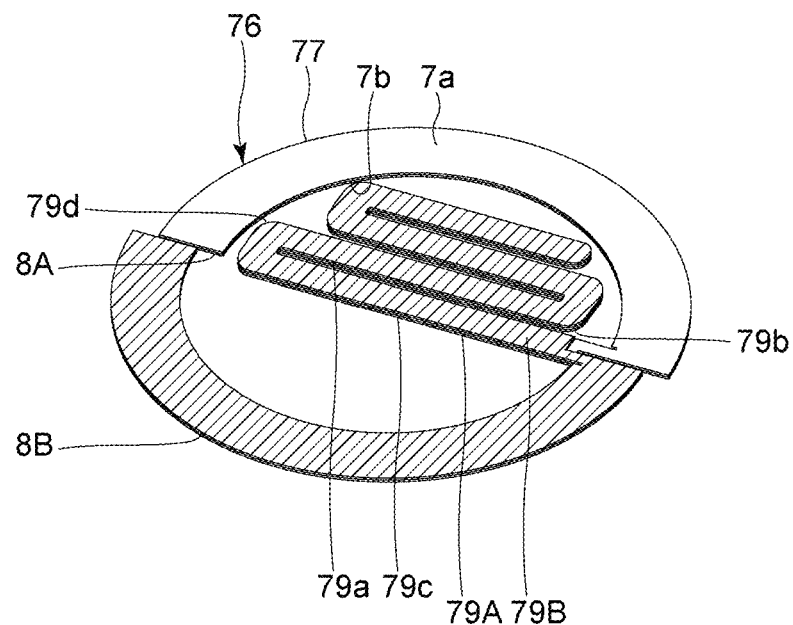
FIG. 25 is a perspective view of a power feeding member in an unbent state in a sixth preferred embodiment of the present invention.

FIG. 25 is a perspective view of a power feeding member in an unbent state according to a sixth preferred embodiment of the present invention.

The present preferred embodiment differs from the fifth preferred embodiment in that a substrate 77, a first external connection electrode 79A, and a second external connection electrode 79B include a meandering portion. Except for the above point, a vibration device in the present preferred embodiment has the same or similar configuration as that of the vibration device in the fifth preferred embodiment.

The substrate 77 includes two substantially semi-annular portions similarly to the fifth preferred embodiment. A linear portion extends inward in the radial direction from one end of one substantially semi-annular portion. Similarly, a linear portion extends inward in the radial direction from one end of the other substantially semi-annular portion. Both linear portions are connected to the meandering portion. The second external connection electrode 79B is provided on the linear portion and the meandering portion on the first surface 7a of the substrate 77. The first external connection electrode 79A is provided on the linear portion and the meandering portion on the second surface 7b.

The first external connection electrode 79A includes a plurality of linear portions 79a and a plurality of corner portions 79b in the meandering portion. Each corner portion 79b has a U-shape or a substantially U-shape. Each corner portion 79b connects two linear portions 79a, respectively. Similarly, the second external connection electrode 79B includes a plurality of linear portions 79c and a plurality of corner portions 79d. Each corner portion 79d connects two linear portions 79c, respectively.

The power feeding member 76 is a flexible printed circuit board. Therefore, when the first external connection electrode 79A is connected to the outside, the meandering portion can be deformed into a linear or substantially linear shape or a curved shape. Similarly, when the second external connection electrode 79B is connected to the outside, the meandering portion can be deformed. Accordingly, the first external connection electrode 79A and the second external connection electrode 79B can be used as long wiring lines, so that the degree of design freedom can be increased. It is sufficient that the first external connection electrode 79A includes at least one corner portion 79b. Similarly, it is sufficient that the second external connection electrode 79B includes at least one corner portion 79d.

Further, in the substrate 77, the meandering portion is on the inner side in the radial direction. Therefore, the shape of the outer circumference of the power feeding member 76 in the unbent state is circular or substantially circular. A maximum value of the dimension of the shape of the outer circumference along the radial direction is therefore small. Similarly to the fifth preferred embodiment, the productivity can thus be increased.

As described above, in the substrate 77 in the present preferred embodiment, the linear portion extends from the substantially semi-annular portion. The linear portion is integrated with the linear portion of the meandering portion as a unitary structure. However, the linear portion of the meandering portion may extend obliquely with respect to the direction in which the above-described linear portion extends.

Also in the present preferred embodiment, the first power feeding electrode 8A, the first external connection electrode 79A, the second power feeding electrode 8B, and the second external connection electrode 79B are provided on the same substrate 77. In addition, the configuration of the electrodes in the portion of the power feeding member 76, which is joined to the piezoelectric element 4, is simple. Accordingly, similar to the fifth preferred embodiment, the reliability of the wiring joint can be improved, and vibration performance can be improved.

Figure 26:
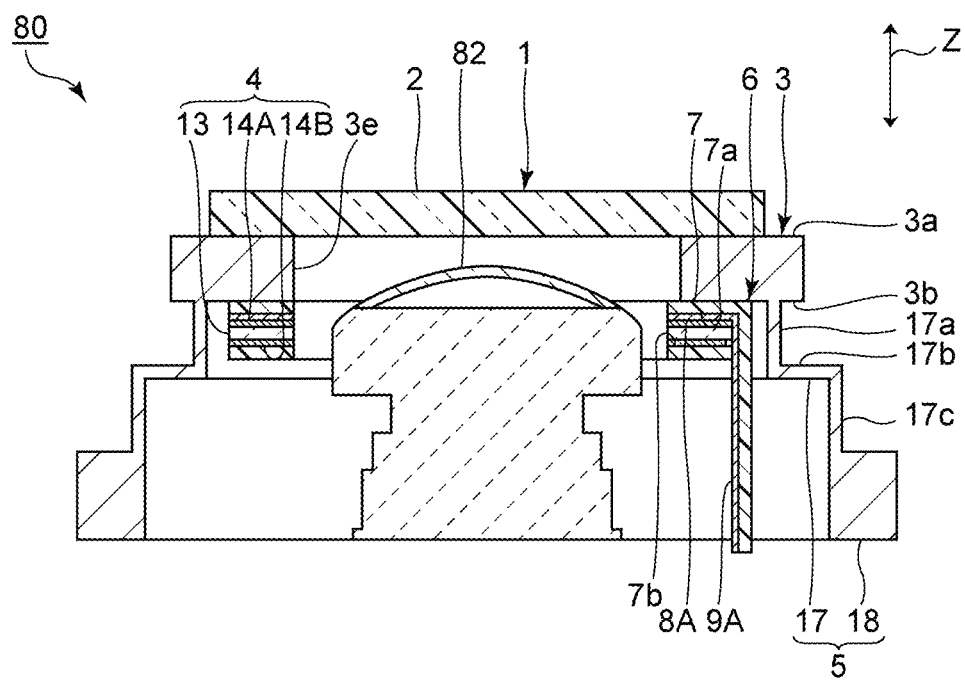
FIG. 26 is a front cross-sectional view of an imaging device according to a seventh preferred embodiment of the present invention.

FIG. 26 is a front cross-sectional view of an imaging device according to a seventh preferred embodiment of the present invention.

As illustrated in FIG. 26, an imaging device 80 as an optical detection device includes the vibration device 1 in the first preferred embodiment and an imaging element 82 disposed in the internal space of the vibration device 1. The vibration device of the imaging device 80 is not limited to the vibration device 1 in the first preferred embodiment. The vibration device of the imaging device 80 may be, for example, the vibration device of any one of the second to sixth preferred embodiments. It is sufficient that the vibration device is a vibration device according to a preferred embodiment of the present invention.

Examples of the imaging element 82 can include a CMOS, a CCD, a bolometer, a thermopile, and the like that receive light having a wavelength in any of a visible region to a far-infrared region. Examples of the imaging device 80 can include a camera, a Radar, a LIDAR device, and the like.

An optical detection element that optically detects an energy ray other than the imaging element 82 may be disposed in the internal space of the vibration device 1. The energy ray to be detected may be, for example, an active energy ray, such as an electromagnetic wave and an infrared ray. A detection region of the optical detection element is included in the light-transmissive cover 2. In the imaging device 80 illustrated in FIG. 26, a visual field of the imaging element 82 as the detection region is included in the light-transmissive cover 2.

Since the imaging device 80 includes the vibration device 1 in the first preferred embodiment, it is possible to improve the reliability of the wiring joint and to improve vibration performance of the vibration device 1.

While preferred embodiments c the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
a cylindrical body including an opening, a first opening end surface, and a second opening end surface;
a light-transmissive cover joined to the first opening end surface of the cylindrical body to cover the opening of the cylindrical body;
a piezoelectric element directly or indirectly joined to the second opening end surface of the cylindrical body and including a first main surface and a second main surface; and
a power feeder joined to the piezoelectric element; wherein
the power feeder includes a substrate including a first surface and a second surface facing each other, a first power feeding electrode and a second power feeding electrode on the first surface or the second surface and electrically insulated from each other, and a first external connection electrode and a second external connection electrode on the first surface or the second surface, the first external connection electrode being connected to the first power feeding electrode and the second external connection electrode being connected to the second power feeding electrode;
the power feeder sandwiches the piezoelectric element in a thickness direction, and the first power feeding electrode and the second power feeding electrode are joined to the first main surface or the second main surface of the piezoelectric element; and
portions of the substrate of the power feeder, which are not located on the first main surface and the second main surface of the piezoelectric element, are bent to sandwich the piezoelectric element in the thickness direction.

2. The vibration device according to claim 1, wherein
the first surface side of the substrate is joined to the second main surface of the piezoelectric element, and the second surface side of the substrate is joined to the first main surface of the piezoelectric element; and
the second power feeding electrode is on the first surface of the substrate, and the first power feeding electrode is on the second surface of the substrate.

3. The vibration device according to claim 1, wherein
the first surface side of the substrate is joined to the first main surface and the second main surface of the piezoelectric element; and
the first power feeding electrode and the second power feeding electrode are on the first surface of the substrate.

4. The vibration device according to claim 3, wherein the first power feeding electrode is joined to one main surface of the first main surface and the second main surface of the piezoelectric element with an insulating adhesive layer and is joined to the other main surface with a conductive adhesive layer.

5. The vibration device according to claim 1, wherein
the piezoelectric element includes an opening;
the substrate includes a first sandwiching portion and a second sandwiching portion that sandwiches the piezoelectric element;
the first sandwiching portion and the second sandwiching portion cover a portion of the piezoelectric element in a circumferential direction when a direction around the opening of the piezoelectric element is defined as the circumferential direction; and
the first power feeding electrode is on the first sandwiching portion and the second power feeding electrode is on the second sandwiching portion.

6. The vibration device according to claim 1, wherein
the piezoelectric element includes an opening, an inner edge on an inner side in a direction orthogonal or substantially orthogonal to a thickness direction of the piezoelectric element, and an outer edge on an outer side in the direction orthogonal or substantially orthogonal to the thickness direction of the piezoelectric element; and
a width of at least one of the first power feeding electrode and the second power feeding electrode is smaller than a width of the piezoelectric element when a direction connecting the inner edge and the outer edge is defined as a width direction of the piezoelectric element, the first power feeding electrode, and the second power feeding electrode.

7. The vibration device according to claim 6, wherein
the first power feeding electrode is joined to the first main surface of the piezoelectric element;
an adhesive layer joining the cylindrical body and the first main surface of the piezoelectric element and the power feeder is provided;
the first power feeding electrode extends to the outer edge of the piezoelectric element and a width of the first power feeding electrode is smaller than a width of the piezoelectric element; and
a thickness of a portion of the adhesive layer, which joins the cylindrical body and the piezoelectric element, is larger than a thickness of a portion of the adhesive layer, which joins the cylindrical body and the power feeder.

8. The vibration device according to claim 1, wherein
the piezoelectric element includes an opening; and
the first external connection electrode and the second external connection electrode extend from the opening side of the piezoelectric element in an outer circumferential edge side and the opening side of the piezoelectric element.

9. The vibration device according to according to claim 1, wherein the piezoelectric element has an annular shape.

10. The vibration device according to claim 1, wherein the first external connection electrode and the second external connection electrode include at least one corner portion.

11. The vibration device according to claim 1, wherein
the piezoelectric element includes a piezoelectric body including a first surface and a second surface facing each other, a first electrode provided on the first surface, and a second electrode provided on the second surface and facing the first electrode;
the first main surface of the piezoelectric element includes the first electrode, and the second main surface includes the second electrode; and the first power feeding electrode is connected to the first electrode and the second power feeding electrode is connected to the second electrode.

12. The vibration device according to claim 1, wherein the cylindrical body is made of metal.

13. The vibration device according to claim 1, further comprising a holder connected to the cylindrical body and fixed to an outside.

14. An optical detection device comprising:
the vibration device according to claim 1; and
an imaging element in an internal space of the vibration device.

15. The optical detection device according to claim 14, wherein
the first surface side of the substrate is joined to the second main surface of the piezoelectric element, and the second surface side of the substrate is joined to the first main surface of the piezoelectric element; and
the second power feeding electrode is on the first surface of the substrate, and the first power feeding electrode is on the second surface of the substrate.

16. The optical detection device according to claim 14, wherein
the first surface side of the substrate is joined to the first main surface and the second main surface of the piezoelectric element; and
the first power feeding electrode and the second power feeding electrode are on the first surface of the substrate.

17. The optical detection device according to claim 16, wherein the first power feeding electrode is joined to one main surface of the first main surface and the second main surface of the piezoelectric element with an insulating adhesive layer and is joined to the other main surface with a conductive adhesive layer.

18. The optical detection device according to claim 14, wherein
the piezoelectric element includes an opening;
the substrate includes a first sandwiching portion and a second sandwiching portion that sandwiches the piezoelectric element;
the first sandwiching portion and the second sandwiching portion cover a portion of the piezoelectric element in a circumferential direction when a direction around the opening of the piezoelectric element is defined as the circumferential direction; and
the first power feeding electrode is on the first sandwiching portion and the second power feeding electrode is on the second sandwiching portion.

19. The optical detection device according to claim 14, wherein
the piezoelectric element includes an opening, an inner edge on an inner side in a direction orthogonal or substantially orthogonal to a thickness direction of the piezoelectric element, and an outer edge on an outer side in the direction orthogonal or substantially orthogonal to the thickness direction of the piezoelectric element; and
a width of at least one of the first power feeding electrode and the second power feeding electrode is smaller than a width of the piezoelectric element when a direction connecting the inner edge and the outer edge is defined as a width direction of the piezoelectric element, the first power feeding electrode, and the second power feeding electrode.

20. The optical detection device according to claim 19, wherein the first power feeding electrode is joined to the first main surface of the piezoelectric element;

an adhesive layer joining the cylindrical body and the first main surface of the piezoelectric element and the power feeder is provided;

the first power feeding electrode extends to the outer edge of the piezoelectric element and a width of the first power feeding electrode is smaller than a width of the piezoelectric element; and a thickness of a portion of the adhesive layer, which joins the cylindrical body and the piezoelectric element, is larger than a thickness of a portion of the adhesive layer, which joins the cylindrical body and the power feeder.

* * * * *